US011555538B2

(12) United States Patent
Lee et al.

(10) Patent No.: US 11,555,538 B2
(45) Date of Patent: Jan. 17, 2023

(54) DISCONNECTOR APPARATUS

(71) Applicant: HYUNDAI TRANSYS INC., Seosan-si (KR)

(72) Inventors: Man Bok Lee, Hwaseong-si (KR); Jin Hwan Lee, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/535,790

(22) Filed: Nov. 26, 2021

(65) Prior Publication Data

US 2022/0389997 A1 Dec. 8, 2022

(30) Foreign Application Priority Data

Jun. 8, 2021 (KR) .......................... 10-2021-0074326

(51) Int. Cl.
| | |
|---|---|
| *F16H 48/08* | (2006.01) |
| *F16H 48/24* | (2006.01) |
| *F16H 48/34* | (2012.01) |
| *F16D 23/12* | (2006.01) |

(52) U.S. Cl.
CPC ............. *F16H 48/08* (2013.01); *F16H 48/24* (2013.01); *F16D 2023/123* (2013.01); *F16H 48/34* (2013.01)

(58) Field of Classification Search
CPC .... F16H 48/08–2048/087; F16H 48/24; F16H 48/34–2048/346; F16D 2023/123
See application file for complete search history.

(56) References Cited

U.S. PATENT DOCUMENTS

| | | | | |
|---|---|---|---|---|
| 6,551,209 | B2* | 4/2003 | Cheadle | .................. F16H 48/24 |
| | | | | 192/84.92 |
| 8,535,194 | B2* | 9/2013 | Juenemann | .......... B60K 17/348 |
| | | | | 475/249 |
| 9,309,932 | B2* | 4/2016 | Yoshimura | ............ B60W 10/02 |
| 10,023,203 | B2* | 7/2018 | Iida | ........................ B60W 10/11 |
| 10,167,939 | B2* | 1/2019 | Onitake | .................. F16D 11/14 |
| 10,851,843 | B2* | 12/2020 | Shibata | ..................... B60T 8/44 |
| 11,174,928 | B2* | 11/2021 | Fukuda | .................. F16H 48/36 |
| 2005/0115755 | A1 | 6/2005 | Sakai et al. | |

(Continued)

FOREIGN PATENT DOCUMENTS

| | | |
|---|---|---|
| DE | 10216290 A1 | 11/2002 |
| DE | 102014221198 A1 | 5/2015 |

(Continued)

*Primary Examiner* — Huan Le
*Assistant Examiner* — James J Taylor, II
(74) *Attorney, Agent, or Firm* — Novick, Kim & Lee PLLC; Jae Youn Kim

(57) ABSTRACT

The present invention provides a disconnector apparatus including: a support ring provided in a differential casing and configured to support a pinion gear mounted therein; a clutch ring having one end penetrating the differential casing, provided in the differential casing, and configured to be coupled to or decoupled from the support ring; an actuator configured to press the other end of the clutch ring to couple the support ring and the clutch ring; and an elastic member coupled to an exposed portion of the clutch ring positioned outside the differential casing, the elastic member having one end in contact with the differential casing and the other end in contact with the actuator.

12 Claims, 4 Drawing Sheets

(56) References Cited

U.S. PATENT DOCUMENTS

2008/0026900 A1* 1/2008 Gotoh .................... F16H 48/34
192/48.1
2021/0270354 A1* 9/2021 Bhurke .................. F16H 48/22

FOREIGN PATENT DOCUMENTS

| | | | |
|---|---|---|---|
| DE | 102015224214 A1 * | 6/2017 |
| DE | 10157899 A1 | 8/2022 |
| JP | 11201262 A | 7/1999 |
| JP | 2009519421 A | 5/2009 |
| KR | 20000043728 A | 7/2000 |
| KR | 1020170123869 A | 11/2017 |

* cited by examiner

Prior Art

# DISCONNECTOR APPARATUS

CROSS-REFERENCE TO RELATED APPLICATIONS

This application claims priority to and the benefit of Korean Patent Application No. 10-2021-0074326 filed in the Korean Intellectual Property Office on Jun. 8, 2021, the entire contents of which are incorporated herein by reference.

TECHNICAL FIELD

The present invention relates to a disconnector apparatus capable of allowing a vehicle, such as an internal combustion engine vehicle (ICEV), a hybrid electric vehicle (HEV), an electric vehicle (EV), or a battery electric vehicle (BEV) to perform four-wheel driving.

BACKGROUND ART

In general, a disconnector apparatus refers to an apparatus mounted in a differential assembly and capable of minimizing an unnecessary loss of power by switching between two-wheel driving (2WD) and four-wheel driving (4WD) by engaging or disengaging a differential shaft depending on a traveling situation.

In the case of most of the disconnector apparatuses in the related art, a control system such as a hydraulic motor or a pneumatic motor is used to move a sleeve to cut off power of an input part such as a motor or an engine or an output part such as a vehicle wheel, thereby switching the driving mode from the four-wheel driving (4WD) to the two-wheel driving (2WD).

FIG. 1 is a view illustrating a disconnector apparatus in the related art. Referring to FIG. 1, a disconnector apparatus 200 in the related art is connected to a differential assembly 100. A differential gear set is mounted in a differential casing 101 of the differential assembly 100. The differential gear set includes two first and second side gears 111 and 112 and two pinion gears 121 and 122 engaging with the first and second side gears 111 and 112.

The disconnector apparatus 200 in the related art includes: a differential shaft 210 provided in the differential casing 101 and connected to the first side gear 111 positioned at the right side in FIG. 2; a hub 220 connected to a right vehicle wheel; a ball screw shaft 240 connected to a motor 230 and configured to be rotated by an operation of the motor 230; a nut 250 configured to move along the ball screw shaft 240 when the ball screw shaft 240 operates in a state in which the nut 250 is coupled to the ball screw shaft 240; and a fork 280 configured to be movable along a guide rail 260 by an operation of the nut 250 and move a sleeve 270 to connect or disconnect the differential shaft 210 and the hub 220.

In the disconnector apparatus 200 in the related art, the ball screw shaft 240 is rotated by the operation of the motor 230 including a position sensor. The rotation of the ball screw shaft 240 moves the fork 280 together with the nut 250 that moves along the ball screw shaft 240. When the fork 280 moves, the sleeve 270 connected to the fork 280 moves, such that the differential shaft 210 and the hub 220 engage with each other to connect the power. The power is cut off as the differential shaft 210 and the hub 220 disengage from each other. Specifically, when the ball screw shaft 240 is rotated in one direction by the operation of the motor 230, the sleeve 270 moves toward the differential shaft 210, and the differential shaft 210 and the hub 220 engage with each other, such that the power is transmitted to the right vehicle wheel. On the contrary, when the ball screw shaft 240 is rotated in the other direction by the operation of the motor 230, the sleeve 270 moves toward the hub 220, and the differential shaft 210 and the hub 220 disengage from each other.

However, in the case of the disconnector apparatus in the related art, the structure for connecting the differential shaft and the hub, which are separated from the motor, through the ball screw shaft, the fork, and the sleeve, is complicated, which excessively increases an overall length, increases an assembly space and a weight, and makes vehicle mountability disadvantageous. Further, electric power consumption (20 A) required to operate the motor is excessively high, and a stroke of a BLDC motor needs to be precisely controlled, which complicates the operation of the control system and increases manufacturing costs. In case of two-wheel driving of a four-wheel drive vehicle having disconnected auxiliary driving wheels, a final reduction gear is stopped when a rotation of an input part is stopped. When the vehicle travels straight at a high speed in the state in which the differential shaft and the hub are disconnected, there is a fatal problem in that a high differential motion of the pinion gear, which rotates at a high speed in conjunction with the rotation of the left side gear, causes noise and vibration.

In contrast, the present invention provides a disconnector apparatus including: a differential casing configured to transmit input torque; a differential gear set configured to perform a differential motion; a support ring configured to support a pinion gear of the differential gear set; a clutch ring configured to disconnect the differential casing and the support ring; an elastic member configured to elastically support the clutch ring; and an actuator configured to control an operation of a ball ramp using non-contact eddy current braking force between a magnetic coil and a rotary conductor plate. Therefore, it is possible to implement a mechanism having a structure in which the differential casing and the support ring are separated so as not to cause a high differential motion. Further, the new concept applied with the non-contact eddy current makes the disconnector apparatus compact and has an advantage in reducing noise.

DOCUMENT OF RELATED ART

Patent Document (Patent Document 1) Korean Patent Application Laid-Open No. 10-2017-0123869 (published on Nov. 9, 2017)

SUMMARY OF THE INVENTION

The present invention has been made in an effort to provide a disconnector apparatus that uses an actuator of a new concept applied with non-contact eddy current and has a compact structure in which a differential casing and a support ring are separated so as not to cause a high differential motion, thereby improving mountability and noise performance.

An exemplary embodiment of the present invention provides a disconnector apparatus including: a support ring provided in a differential casing and configured to support a pinion gear mounted therein; a clutch ring having one end penetrating the differential casing, provided in the differential casing, and configured to be coupled to or decoupled from the support ring; an actuator configured to press the other end of the clutch ring to couple the support ring and the clutch ring; and an elastic member coupled to an exposed portion of the clutch ring positioned outside the differential casing, the elastic member having one end in contact with the differential casing and the other end in contact with the actuator.

The actuator may include: a first ball ramp; a second ball ramp positioned between the first ball ramp and the clutch ring; a ball interposed between the first ball ramp and the second ball ramp; a rotary conductor plate configured to surround an outer periphery of the first ball ramp; and one or more electromagnetic devices provided along an outer periphery of the rotary conductor plate and configured to generate an electromagnetic field when power is applied.

The electromagnetic device may operate the ball by inducing eddy current on the rotary conductor plate that rotates by the electromagnetic field generated when the power is applied, and the operation of the ball may allow the second ball ramp to push the clutch ring in a direction toward the support ring such that a dog portion of the clutch ring and a dog portion of the support ring are coupled.

One surface of the second ball ramp may be connected to the clutch ring, the other surface of the second ball ramp may be directed toward the first ball ramp, and a surface of the second ball ramp, which is directed toward the clutch ring, may be elastically supported by the elastic member and press the other end of the clutch ring in a direction toward the support ring.

The ball may be inserted between a first groove provided in the first ball ramp and a second groove provided in the second ball ramp and corresponding to the first groove, and the first and second grooves may conform with the ball.

First and second dog portions may be provided at one end of the clutch ring.

The first dog portion may be coupled to a third dog portion provided on the support ring, and the second dog portion may be coupled to a fourth dog portion provided on the differential casing.

The rotary conductor plate may be made of aluminum or copper.

The ball may be a steel ball.

The electromagnetic device may include: a core coupled to the outer periphery of the rotary conductor plate; and a magnetic coil positioned on the outer periphery of the rotary conductor plate and structured to penetrate the inside of the core and surround an outer side of the core.

The magnetic coil and the core may be fixed to a transmission housing and independent of a rotation of the differential casing.

The differential casing may have an extension portion provided at one side thereof, and the actuator may be mounted outside the extension portion.

A central shaft may be provided in the support ring, pinion gears may be rotatably coupled at two opposite sides of the central shaft, and side gears engaging with the two pinion gears may be provided at two opposite sides with the two pinion gears therebetween.

A cover may be detachably provided at a lateral end of the differential casing, and a driving gear may be mounted on the cover.

The present invention provides the structure in which the differential casing and the support ring are separated, the high differential motion is not generated, and the actuator is integrated on the basis of the non-contact eddy current concept. Therefore, it is possible to improve noise performance and mountability with the compact size.

According to the present invention, in the case of the auxiliary wheels that coast when the vehicle travels in the two-wheel driving (2WD) mode as the disconnector apparatus is decoupled, the support ring for supporting the side gear also rotates, which makes it possible to prevent the high differential motion.

According to the present invention, current consumption is low since the magnetic coil is used. The size of the magnetic coil may be decreased by the increase in force generated by the ball ramp, which makes it possible to minimize the current consumption.

According to the present invention, friction is not generated since the rotary conductor plate and the electromagnetic field perform the non-contact rotational motion, which makes it possible to prevent abrasion and noise of the components. Further, an additional special coating process is not required, which makes it possible to reduce costs.

According to the present invention, an expensive actuator such as a BLDC motor, a ball screw shaft, or a fork requiring high current consumption in the related art may be substituted with the magnetic coil and the ball ramp, which are low-priced and require low current consumption, which makes it possible to reduce costs.

According to the present invention, since the differential assembly and the disconnector apparatus are integrated, it is possible to significantly reduce the overall length and considerably reduce the weight and improve packaging mountability.

According to the present invention, large-sized components such as a hub and a sleeve may be eliminated, and bearings for supporting the large-sized components may be eliminated, which makes it possible to reduce manufacturing costs.

According to the present invention, the differential assembly and the disconnector apparatus are integrated, which makes it possible to simplify the assembly process.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
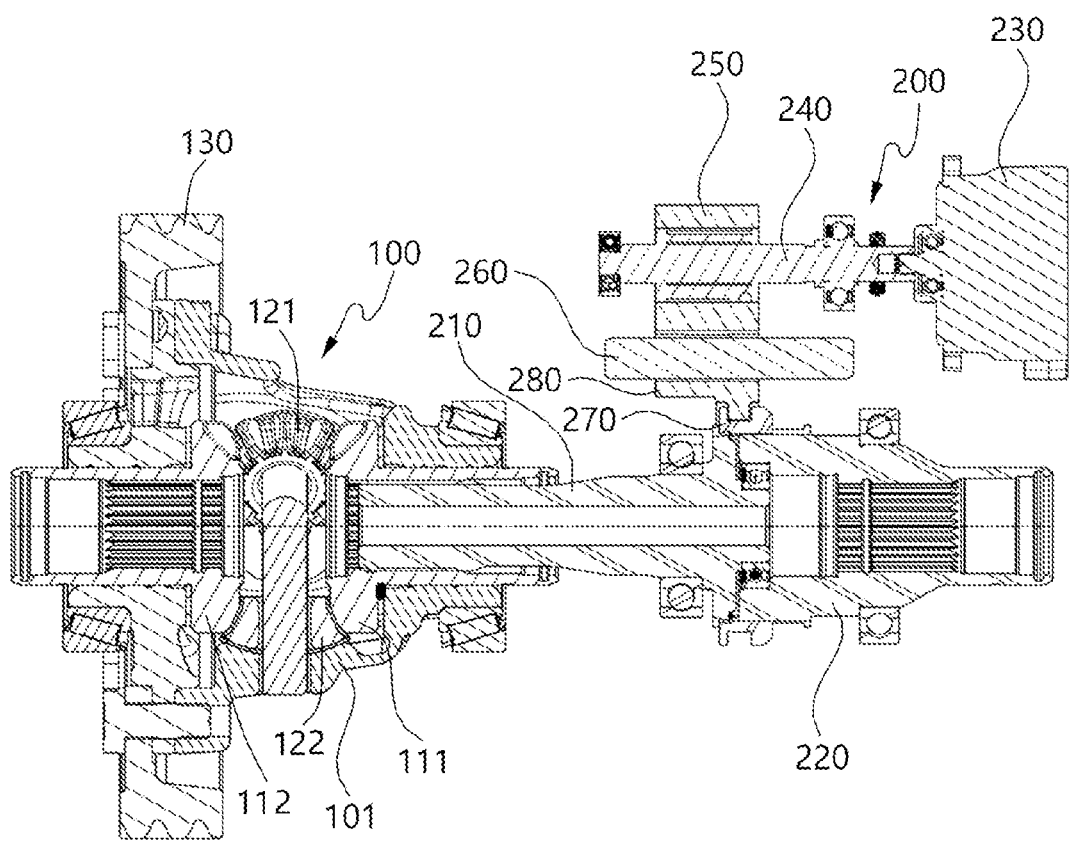
FIG. 1 is a view illustrating a disconnector apparatus in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
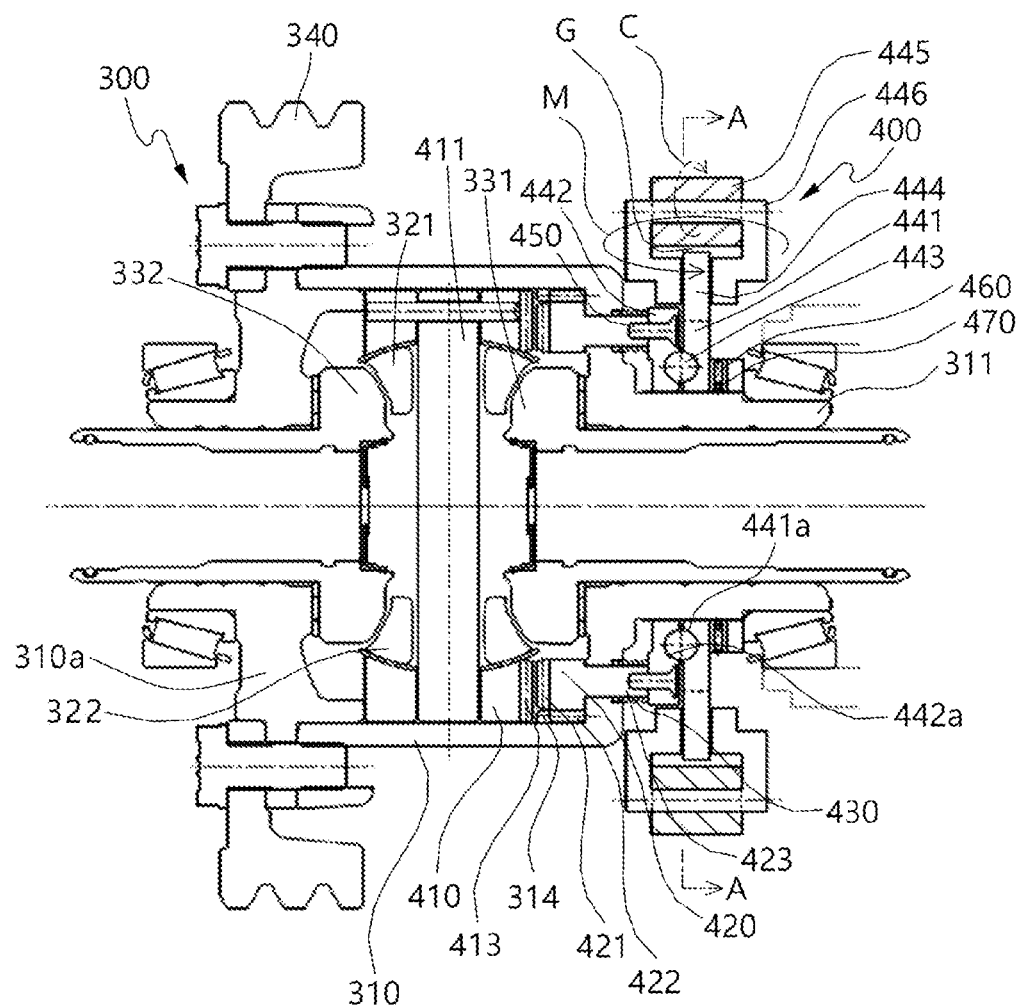
FIG. 2 is a view illustrating a disconnector apparatus according to an exemplary embodiment of the present invention.

FIG. 2 is a view illustrating a disconnector apparatus according to an exemplary embodiment of the present invention.

In a case in which front wheels or rear wheels of a four-wheel drive (4WD) vehicle are main driving wheels and the other wheels are auxiliary wheels, a disconnector apparatus 400 according to the present invention provides a power transmission interrupting device capable of improving fuel economy by inhibiting rotational resistance (drag) of an auxiliary wheel speed reducer caused when the vehicle coasts and preventing a counter electromotive force of a motor when the vehicle travels using only power of the main driving wheels.

As illustrated in FIG. 2, the disconnector apparatus 400 according to the present invention is coupled to a differential assembly 300. The disconnector apparatus 400 according to the present invention includes a support ring 410 configured to support a differential pinion gear 320, a clutch ring 420 configured to be coupled to or decoupled from the support ring 410, an actuator configured to press the clutch ring 420 to couple the support ring 410 and the clutch ring 420, and an elastic member 430 configured to elastically support the actuator by being coupled to the clutch ring 420.

Specifically, a differential casing 310, which constitutes the differential assembly 300, includes an extension portion 311. The extension portion 311 extends in one direction toward the actuator from one side of the differential casing 310.

The differential casing 310 may have a separable structure. For example, a cover 310a may be disposed at a lateral end of the differential casing 310, which is directed toward a driving gear 340, and the cover 310a may be attached or detached by a coupling member such as a bolt. The driving gear 340 may be mounted outside the cover 310a. The cover 310a may support a second side gear 332.

The differential gear set is provided in the differential casing 310 and includes first and second side gears 331 and 332 and first and second pinion gears 321 and 322. For example, the first side gear 331 may be positioned at the right side in FIG. 2. For example, the second side gear 332 may be positioned at the left side in FIG. 2.

Gear teeth are provided at one end of the first side gear 331 directed toward the second side gear 332. The other end of the first side gear 331 may be partially exposed to the outside through the inside of the extension portion 311. The first and second side gears 331 and 332, which are disposed at two opposite sides, may be connected to auxiliary wheels (not illustrated) at two left and right opposite sides through a driving shaft (not illustrated).

A support member 460 may be provided on the extension portion 311. The support member 460 may support a first ball ramp 441 of the actuator. The support member 460 may be a thrust bearing. The support member 460 may be positioned on one surface of the first ball ramp 441 of the actuator. The extension portion 311 may be rotatably supported by a bearing.

The support ring 410 is provided in the differential casing 310. The support ring 410 is disposed in the differential casing 310 and supports the first and second pinion gears 321 and 322. For example, the support ring 410 is structured to be separated from the differential casing 310 so as to operate in the differential casing 310. A central shaft 411 is provided in the support ring 410. The first and second pinion gears 321 and 322 are rotatably coupled to two opposite sides of the central shaft 411. The first and second pinion gears 321 and 322 are positioned between the first and second side gears 331 and 332.

The clutch ring 420 is provided in the differential casing 310 in a state in which one end of the clutch ring 420 penetrates the differential casing 310. The clutch ring 420 may be coupled to or decoupled from the support ring 410.

The clutch ring 420 has two dog portions so as to be simultaneously coupled to a dog portion of the differential casing 310 and a dog portion of the support ring 410. Specifically, the clutch ring 420 may include a first dog portion 421 and a second dog portion 422. The first dog portion 421 and the second dog portion 422 are provided at one end of the clutch ring 420 positioned in the differential casing 310.

Specifically, the first dog portion 421 may be provided at a tip of the clutch ring 420 facing a lateral surface of the support ring 410. The second dog portion 422 may be provided on an outer peripheral surface of the clutch ring 420 perpendicular to the first dog portion 421.

The first dog portion 421 corresponds to a third dog portion 413 provided on the support ring 410. The third dog portion 413 may be provided on a lateral surface of the support ring 410 facing the first dog portion 421.

The second dog portion 422 corresponds to a fourth dog portion 314 provided on the differential casing 310. The fourth dog portion 314 may be provided on an inner peripheral surface of the differential casing 310 facing the second dog portion 422.

The two dog portions of the first and second dog portions 421 and 422, which are perpendicular to each other as described above, may be securely coupled to the third and fourth dog portions 413 and 314.

The elastic member 430 is positioned outside the differential casing 310. For example, the elastic member 430 may be a return spring. The elastic member 430 is coupled to an exposed portion 423 of the clutch ring 420. The elastic member 430 has one end in contact with the differential casing 310 and the other end in contact with a second ball ramp 442 of the actuator.

For example, the actuator may have a structure in which the ball ramp operates using a braking force of non-contact eddy current C between a magnetic coil 445 and a rotary conductor plate 444.

Specifically, the actuator presses the other end of the clutch ring 420 to couple the support ring 410 and the clutch ring 420.

The actuator includes the first ball ramp 441, the second ball ramp 442 positioned between the first ball ramp 441 and the clutch ring 420, a ball 443 interposed between the first ball ramp 441 and the second ball ramp 442, the rotary conductor plate 444 configured to surround an outer periphery of the first ball ramp 441, and an electromagnetic device provided along an outer periphery of the rotary conductor plate 444.

Specifically, the first ball ramp 441 is mounted such that a center of the first ball ramp 441 is positioned outside the extension portion 311. The first ball ramp 441 faces the second ball ramp 442. For example, the first ball ramp 441 may be provided in the form of a circular plate having a larger outer diameter than the second ball ramp 442.

For example, the second ball ramp 442 may be provided in the form of a circular plate having a smaller outer diameter than the first ball ramp 441. One surface of the second ball ramp 442, which is directed toward the clutch ring 420, may be coupled to the other end of the clutch ring 420 by a bolt 450 or a coupling method such as welding.

The second ball ramp 442 is mounted such that a center of the second ball ramp 442 is positioned outside the extension portion 311. A surface of the second ball ramp 442, which is directed toward the clutch ring 420, is elastically supported by the elastic member 430. The surface of the second ball ramp 442, which is directed toward the clutch ring 420, presses the other end of the clutch ring 420 in the direction toward the support ring 410.

The ball 443 is interposed between the first ball ramp 441 and the second ball ramp 442. For example, the ball 443 may be a steel ball. Specifically, the first ball ramp 441 has a first groove 441a. The second ball ramp 442 has a second groove 442a corresponding to the first groove 441a. The external shapes of the first and second grooves 441a and 442a conform with the ball 443. The ball 443 is inserted between the first groove 441a and the second groove 442a.

Figure 3:
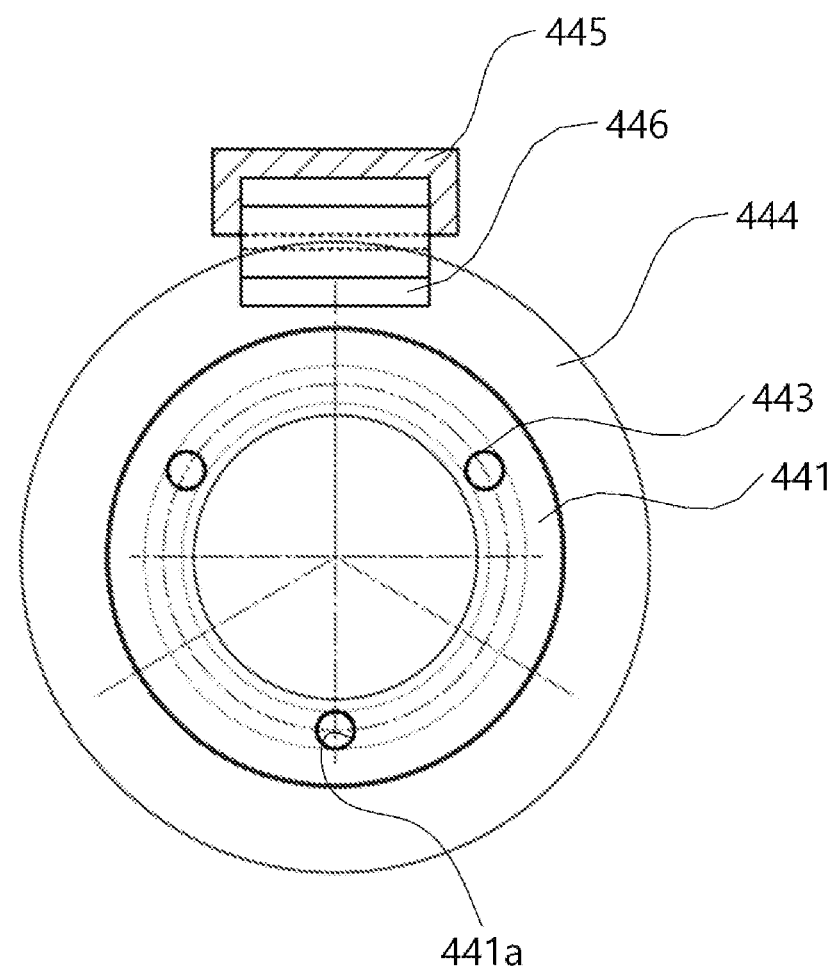
FIG. 3 is a cross-sectional view taken along line A-A in FIG. 2 and illustrating a state in which a single magnetic coil is mounted on a rotary conductor plate.
Figure 4:
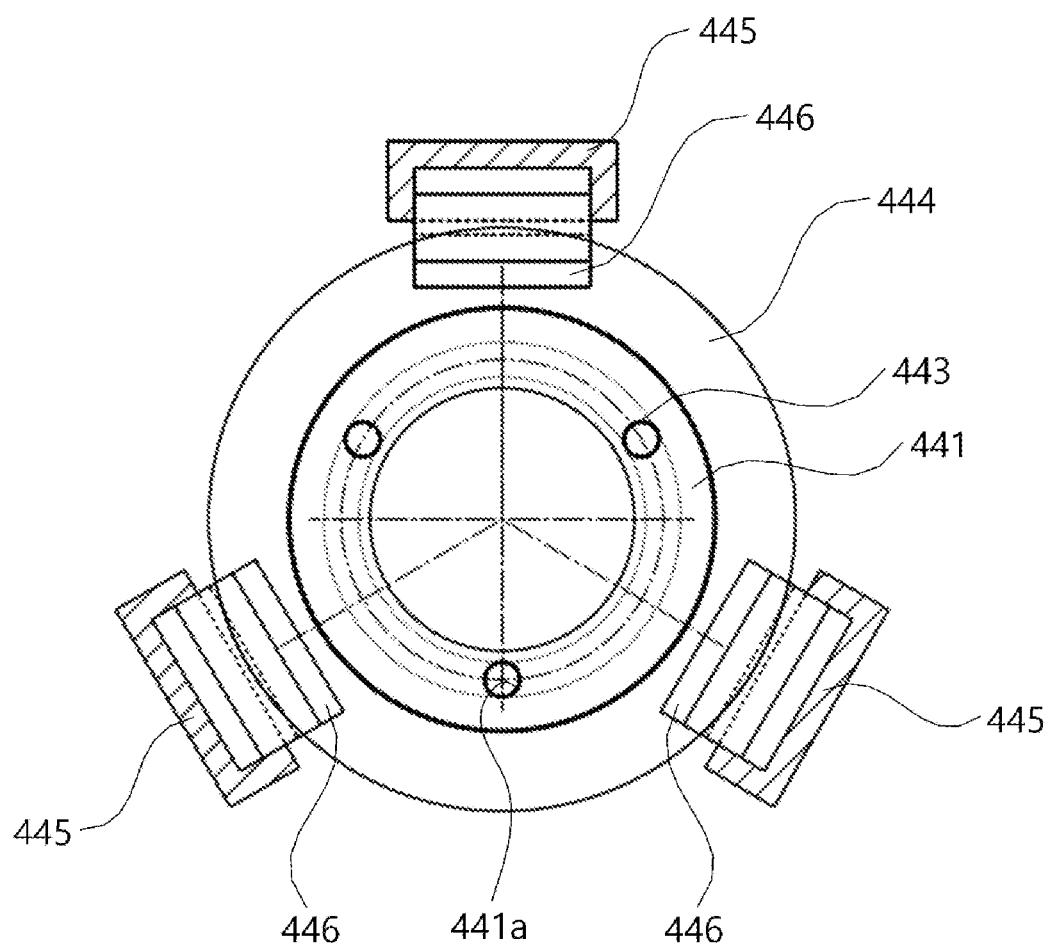
FIG. 4 is a cross-sectional view taken along line A-A in FIG. 2 and illustrating a state in which a plurality of magnetic coils is mounted on the rotary conductor plate.

FIG. 3 is a cross-sectional view taken along line A-A in FIG. 2 and illustrating a state in which a single magnetic coil is mounted on the rotary conductor plate, and FIG. 4 is a cross-sectional view taken along line A-A in FIG. 2 and illustrating a state in which a plurality of magnetic coils is mounted on the rotary conductor plate.

The rotary conductor plate 444 is structured to surround the outer periphery of the first ball ramp 441, and the electromagnetic device is provided on an outer periphery of the rotary conductor plate 444. The rotary conductor plate 444 may be made of a nonmetallic material such as aluminum or copper. One or more electromagnetic devices may be provided outside the rotary conductor plate 444.

For example, the rotary conductor plate 444 may be connected to the first ball ramp 441 by a method such as welding or press-fitting. For example, the rotary conductor plate 444 may be adjusted by an element such as a shim 470 so as to have a predetermined air gap G in a non-contact manner without direct friction with the magnetic coil 445. The shim 470 or the like may be used to adjust an error when the rotary conductor plate 444 and the magnetic coil 445, which constitute the actuator, are processed and assembled.

Specifically, the electromagnetic device may induce the eddy current C on the rotary conductor plate 444 that rotates by means of an electromagnetic field M generated when power is applied. The eddy current braking force is applied by the eddy current C to the first ball ramp 441 connected directly to the rotary conductor plate 444, such that the ball 443 is operated, and the second ball ramp 442 is pushed in the direction toward the clutch ring 420 by the operation of the ball 443. As the clutch ring 420 is pushed by the second ball ramp 442, the first dog portion 421 may be coupled to the third dog portion 413 of the support ring 410, and the second dog portion 422 may be accurately coupled to a fourth dog portion 314 of the differential casing 310.

The electromagnetic device includes a core 446 and the magnetic coil 445. For example, the magnetic coil 445 and the core 446 may be fixed to a transmission housing (not illustrated). The disconnector apparatus 400 may be embedded in the transmission housing (not illustrated). The core 446 is positioned on the outer periphery of the rotary conductor plate 444.

As illustrated in FIG. 3, a single core 446 may be provided on the outer periphery of the rotary conductor plate 444. As illustrated in FIG. 4, three or more cores 446 may be provided on the outer periphery of the rotary conductor plate 444. The magnetic coil 445 may be structured to be wound around an outer periphery of the core 446 while penetrating the inside of the core 446.

An operation of the disconnector apparatus according to the present invention during the two-wheel driving will be described.

As illustrated in FIG. 2, in an initial state before power is applied to the magnetic coil 445 during the two-wheel driving (2WD), the clutch ring 420 is positioned in a direction in which the dog portion is decoupled. Therefore, the disconnector apparatus may operate by a normal open type in the two-wheel driving (2WD) mode.

Specifically, in the two-wheel driving (2WD) state, the second ball ramp 442 is positioned adjacent to the first ball ramp 441 by being pushed by the elastic force of the elastic member 430. Therefore, the first dog portion 421 of the clutch ring 420 and the third dog portion 413 of the support ring 410 disengage, and the second dog portion 422 of the clutch ring 420 and the fourth dog portion 314 of the differential casing 310 disengage. In this state, an operation of a power source such as a motor (not illustrated) of a speed reducer is stopped, and thus power of the power source is not transmitted to the driving gear 340.

When the two auxiliary wheels (not illustrated) coast, the rotational force of the two auxiliary wheels is transmitted to the two first and second side gears 331 and 332 through the driving shaft (not illustrated), such that the first and second side gears 331 and 332 rotate.

Since the first and second side gears 331 and 332 engage with the first and second pinion gears 321 and 322, the support ring 410 also rotates together with the first and second side gears 331 and 332 as the first and second side gears 331 and 332 rotate.

In this case, since the support ring 410 is separated from the differential casing 310, only the support ring 410 rotates, but the differential casing 310 does not rotate. Therefore, the two-wheel driving may be performed such that the auxiliary wheels coast and only the main driving wheels travel.

As described above, when the two auxiliary wheels (not illustrated) coast, the rotational force of the two auxiliary wheels is transmitted only to the support ring 410 through the first and second side gears 331 and 332 and the first and second pinion gears 321 and 322. Therefore, the support ring 410 rotates in the differential casing 310 in the state in which the differential casing 310 does not rotate, which makes it possible to prevent a high differential motion.

Next, an operation of the disconnector apparatus according to the present invention during the four-wheel driving will be described.

As illustrated in FIG. 2, the power is applied to the magnetic coil 445 when the rotary conductor plate 444 connected to the differential casing 310 rotates as the vehicle operates.

During the four-wheel driving (4WD), the power is applied to the magnetic coil 445, and thus the electromagnetic field M is generated. The eddy current C is generated on the rotary conductor plate 444 rotated by the generated electromagnetic field M.

The eddy current C generates a rotational resistance force in a direction opposite to the rotation direction. The rotational resistance force is generated on the basis of an eddy current braking principle. The rotational resistance force generates a difference in speed between the first and second ball ramps 441 and 442 connected to the rotary conductor plate 444. In this case, the dog portions of the clutch ring 420 and the support ring 410 may be coupled by the operation of the steel ball 443.

The second ball ramp 442 is assembled and integrated with the clutch ring 420 by the bolt 450 or welding, such that the second ball ramp 442 is positioned by the elastic member 430 in the initial state in the direction in which the dog portions are released, and the second ball ramp 442 may be rotated by being synchronized with the differential casing 310 by the engagement of the dog portions of the clutch ring 420 and the differential casing 310.

Specifically, the eddy current C is generated on the rotary conductor plate 444, and the rotational resistance force is generated in the direction opposite to the rotation direction by the eddy current C, such that the steel ball 443 pushes the second ball ramp 442 in the axial direction. The second ball ramp 442, together with the elastic member 430, pushes the clutch ring 420 in the direction toward the support ring 410.

As the clutch ring 420 is pushed by the second ball ramp 442, the first dog portion 421 of the clutch ring 420 is coupled to the third dog portion 413 of the support ring 410, and the second dog portion 422 of the clutch ring 420 is coupled to the fourth dog portion 314 of the differential casing 310. Therefore, the vehicle may operate in the four-wheel driving (4WD) mode.

During the four-wheel driving (4WD), the power of the power source such as the motor of the speed reducer is transmitted to the driving gear 340. Since the dog portions of the clutch ring 420 and the support ring 410 are coupled, the power of the power source is transmitted to the differential casing 310 through the driving gear 340, such that the differential casing 310 rotates. The driving gear 340 may be connected to the differential casing 310 by a coupling member such as a bolt and transmit the power of the power source to the differential casing 310.

As the differential casing 310 rotates, the support ring 410 rotates in the differential casing 310. During the four-wheel driving (4WD), the first dog portion 421 of the clutch ring 420 is coupled to the third dog portion 413 of the support ring 410, and the second dog portion 422 of the clutch ring 420 is coupled to the fourth dog portion 314 of the differential casing 310, such that the power of the power source may be transmitted to the support ring 410 through the driving gear 340, the differential casing 310, and the clutch ring 420.

As the support ring 410 rotates, the power is transmitted to the first and second side gears 331 and 332 engaging with the first and second pinion gears 321 and 322, such that the first and second side gears 331 and 332 rotate.

As the first and second side gears 331 and 332 rotate, the power is transmitted to the two auxiliary wheels through the driving shaft (not illustrated) connected to the first and second side gears 331 and 332 at two opposite sides, such that the two auxiliary wheels may rotate. Therefore, the four-wheel driving may be performed as the power of the power source is transmitted to the auxiliary wheels as well as the main driving wheels.

Meanwhile, when the supply of the power to the magnetic coil 445 is cut off, the rotational resistance force disappears. Therefore, the compressed elastic member 430 is stretched to the original state. As the elastic member 430 is stretched, the second ball ramp 442, which presses the clutch ring 420, is moved to the original position in the direction toward the first ball ramp 441, such that the pressing force of the clutch ring 420 disappears.

As the pressing force of the clutch ring 420 disappears, the first dog portion 421 of the clutch ring 420 and the third dog portion 413 of the support ring 410 are decoupled, and the second dog portion 422 of the clutch ring 420 and the fourth dog portion 314 of the differential casing 310 are decoupled.

Since the first and second dog portions 421 and 422 of the clutch ring 420 are formed to have flat surfaces, the third dog portion 413 of the support ring 410 and the fourth dog portion 314 of the differential casing 310 may quickly come into contact with each other with appropriate responsiveness when the third dog portion 413 of the support ring 410 and the fourth dog portion 314 of the differential casing 310 are coupled. Further, the third dog portion 413 of the support ring 410 and the fourth dog portion 314 of the differential casing 310 are coupled by an appropriate force. Therefore, precise control is not required, and a simple control system may be implemented.

In the present invention, a sensor capable of measuring a displacement may be required to be mounted to prevent the separation of the clutch ring and the support ring during the process of correcting and operating the magnetic force in accordance with the stroke of the second ball ramp. To this end, although not specifically illustrated in the drawings, a stroke sensor for measuring a displacement and checking whether the clutch ring and the support ring are appropriately coupled may be provided. The stroke sensor may be an on/off sensor that detects only on/off positions in a fail-safe manner.

Meanwhile, as illustrated in FIG. 3, the magnetic coil 445 may be wound around only a single portion in the circumferential direction of the rotary conductor plate 444 when the electromagnetic field M needs to be changed for the respective rotation positions of the rotary conductor plate 444 to generate the eddy current C.

As illustrated in FIG. 4, when the eddy current braking force required for the application is high, the plurality of magnetic coils 445 is provided in the circumferential direction, such that the rotational resistance force (braking force) may be increased.

As described above, the present invention provides the structure in which the differential casing and the support ring are separated, the high differential motion is not generated, and the actuator is integrated on the basis of the non-contact eddy current concept. Therefore, it is possible to improve noise performance and mountability with the compact size. In addition, according to the present invention, in the case of the auxiliary wheels that coast when the vehicle travels in the two-wheel driving (2WD) mode as the disconnector apparatus is decoupled, the support ring tor supporting the side gear also rotates, which makes it possible to prevent the high differential motion. In addition, according to the present invention, current consumption is low since the magnetic coil is used. The size of the magnetic coil may be decreased by the increase in force generated by the ball ramp, which makes it possible to minimize the current consumption. In addition, according to the present invention, friction is not generated since the rotary conductor plate and the electromagnetic field perform the non-contact rotational motion, which makes it possible to prevent abrasion and noise of the components. Further, an additional special coating process is not required, which makes it possible to reduce costs. In addition, according to the present invention, an expensive actuator such as a BLDC motor, a ball screw shaft, or a fork requiring high current consumption in the related art may be substituted with the magnetic coil and the ball ramp, which are low-priced and require low current consumption, which makes it possible to reduce costs. In addition, according to the present invention, since the differential assembly and the disconnector apparatus are integrated, it is possible to significantly reduce the overall length and considerably reduce the weight and improve packaging mountability. In addition, according to the present invention, large-sized components such as a hub and a sleeve may be eliminated, and bearings for supporting the large-sized components may be eliminated, which makes it possible to reduce manufacturing costs. In addition, according to the present invention, the differential assembly and the disconnector apparatus are integrated, which makes it possible to simplify the assembly process.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A disconnector apparatus comprising:
   a support ring provided in a differential casing;
   a clutch ring having one end penetrating the differential casing, provided in the differential casing, and configured to be coupled to or decoupled from the support ring;
   an actuator configured to press the other end of the clutch ring to couple the support ring and the clutch ring; and
   an elastic member coupled to an exposed portion of the clutch ring positioned outside the differential casing, the elastic member having one end in contact with the differential casing and the other end in contact with the actuator,
   wherein the actuator comprises:
   a first ball ramp;
   a second ball ramp positioned between the first ball ramp and the clutch ring;
   a ball interposed between the first ball ramp and the second ball ramp;
   a rotary conductor plate configured to surround an outer periphery of the first ball ramp; and
   one or more electromagnetic devices provided along an outer periphery of the rotary conductor plate and configured to generate an electromagnetic field when power is applied,
   wherein the one or more electromagnetic devices operate the ball by inducing eddy current on the rotary conductor plate that rotates by the electromagnetic field generated when the power is applied, and
   wherein the operation of the ball allows the second ball ramp to push the clutch ring in a direction toward the support ring such that a dog portion of the clutch ring and a dog portion of the support ring are coupled.

2. The disconnector apparatus of claim 1, wherein one surface of the second ball ramp is connected to the clutch ring, the other surface of the second ball ramp is directed toward the first ball ramp, and the one surface of the second ball ramp, which is directed toward the clutch ring, is elastically supported by the elastic member and presses the other end of the clutch ring in the direction toward the support ring.

3. The disconnector apparatus of claim 1, wherein the ball is inserted between a first groove provided in the first ball ramp and a second groove provided in the second ball ramp and corresponding to the first groove, and the first and second grooves conform with the ball.

4. The disconnector apparatus of claim 1, wherein the rotary conductor plate is made of aluminum or copper.

5. The disconnector apparatus of claim 1, wherein the ball is a steel ball.

6. The disconnector apparatus of claim 1, wherein the differential casing has an extension portion provided at one side thereof, and the actuator is mounted outside the extension portion.

7. The disconnector apparatus of claim 1, wherein a central shaft is provided in the support ring, two pinion gears are rotatably coupled at two opposite sides of the central shaft, and side gears engaging with the two pinion gears are provided at two opposite sides with the two pinion gears therebetween.

8. The disconnector apparatus of claim 1, wherein a cover is detachably provided at a lateral end of the differential casing, and a driving gear is mounted on the cover.

9. A disconnector apparatus comprising:
   a support ring provided in a differential casing and configured to support a pinion gear mounted therein;
   a clutch ring having one end penetrating the differential casing, provided in the differential casing, and configured to be coupled to or decoupled from the support ring;
   an actuator configured to press the other end of the clutch ring to couple the support ring and the clutch ring; and
   an elastic member coupled to an exposed portion of the clutch ring positioned outside the differential casing, the elastic member having one end in contact with the differential casing and the other end in contact with the actuator,
   wherein the actuator comprises:
   a first ball ramp;

a second ball ramp positioned between the first ball ramp and the clutch ring;

a ball interposed between the first ball ramp and the second ball ramp;

a rotary conductor plate configured to surround an outer periphery of the first ball ramp; and one or more electromagnetic devices provided along an outer periphery of the rotary conductor plate and configured to generate an electromagnetic field when power is applied; and wherein first and second dog portions are provided at the one end of the clutch ring.

10. The disconnector apparatus of claim 9, wherein the first dog portion is coupled to a third dog portion provided on the support ring, and the second dog portion is coupled to a fourth dog portion provided on the differential casing.

11. A disconnector apparatus comprises:

a support ring provided in a differential casing and configured to support a pinion gear mounted therein;

a clutch ring having one end penetrating the differential casing, provided in the differential casing, and configured to be coupled to or decoupled from the support ring;

an actuator configured to press the other end of the clutch ring to couple the support ring and the clutch ring; and an elastic member coupled to an exposed portion of the clutch ring positioned outside the differential casing, the elastic member having one end in contact with the differential casing and the other end in contact with the actuator, and wherein the actuator comprises:

a first ball ramp;

a second ball ramp positioned between the first ball ramp and the clutch ring;

a ball interposed between the first ball ramp and the second ball ramp;

a rotary conductor plate configured to surround an outer periphery of the first ball ramp; and one or more electromagnetic devices provided along an outer periphery of the rotary conductor plate and configured to generate an electromagnetic field when power is applied, and wherein the one or more electromagnetic devices comprises:

a core coupled to the outer periphery of the rotary conductor plate; and a magnetic coil positioned on the outer periphery of the rotary conductor plate and structured to penetrate an inside of the core and surround an outer side of the core.

12. The disconnector apparatus of claim 11, wherein the magnetic coil and the core are fixed to a transmission housing and independent of a rotation of the differential casing.

* * * * *